(12) United States Patent
Lisboa

(10) Patent No.: US 8,713,094 B2
(45) Date of Patent: Apr. 29, 2014

(54) EVENT-ASSOCIATING SOFTWARE APPLICATION FOR ACCESSING DIGITAL MEDIA

(76) Inventor: Michael-Anthony W. Lisboa, San Francisco, CA (US)

( * ) Notice: Subject to any disclaimer, the term of this patent is extended or adjusted under 35 U.S.C. 154(b) by 587 days.

(21) Appl. No.: 12/623,371

(22) Filed: Nov. 21, 2009

(65) Prior Publication Data

US 2011/0126184 A1    May 26, 2011

(51) Int. Cl.
*G06F 15/16*      (2006.01)
*G06F 7/00*       (2006.01)
*G06F 9/46*       (2006.01)

(52) U.S. Cl.
USPC .............................. 709/203; 707/600; 718/102

(58) Field of Classification Search
USPC ............ 718/102; 707/104.1, 1, 600; 709/203, 709/223
See application file for complete search history.

(56) References Cited

U.S. PATENT DOCUMENTS

| | | | |
|---|---|---|---|
| 7,509,347 B2 * | 3/2009 | Chambers | 1/1 |
| 7,680,809 B2 * | 3/2010 | Deng et al. | 707/706 |
| 8,099,407 B2 * | 1/2012 | Auerbach et al. | 707/709 |
| 8,161,053 B1 * | 4/2012 | Khan et al. | 707/749 |
| 2003/0212778 A1 * | 11/2003 | Collomb | 709/223 |
| 2005/0234875 A1 * | 10/2005 | Auerbach et al. | 707/3 |
| 2005/0246588 A1 * | 11/2005 | Deng et al. | 714/38 |
| 2006/0004691 A1 * | 1/2006 | Sifry | 707/1 |
| 2006/0262352 A1 * | 11/2006 | Hull et al. | 358/1.18 |
| 2007/0124333 A1 * | 5/2007 | Bontempi | 707/104.1 |
| 2008/0168449 A1 * | 7/2008 | Rice et al. | 718/102 |

* cited by examiner

*Primary Examiner* — Brian P Whipple
*Assistant Examiner* — Michael A Chambers

(57) ABSTRACT

The Event-Associating Software Application for Accessing Digital Media (the "Software Application") consists of a Software Application designed to receive messages and digital media files from external sources, then to read and categorize each file's metadata based on events of which the person submitting the file has taken a photograph or a video, or recorded audio. The Software Application parses each file's metadata, looks up events in the System database to match with the digital media file, and associates those events with the message. The Application's parsing function generally comprises reading the metadata, splitting it up into component parts, and categorizing it in databases together with the message data, which consists of EXIF data (Exchangeable Image File Format data, such as time, location, and other related tags) encoded in photograph and audio files and user-generated text and tags that accompany the files.

18 Claims, 1 Drawing Sheet

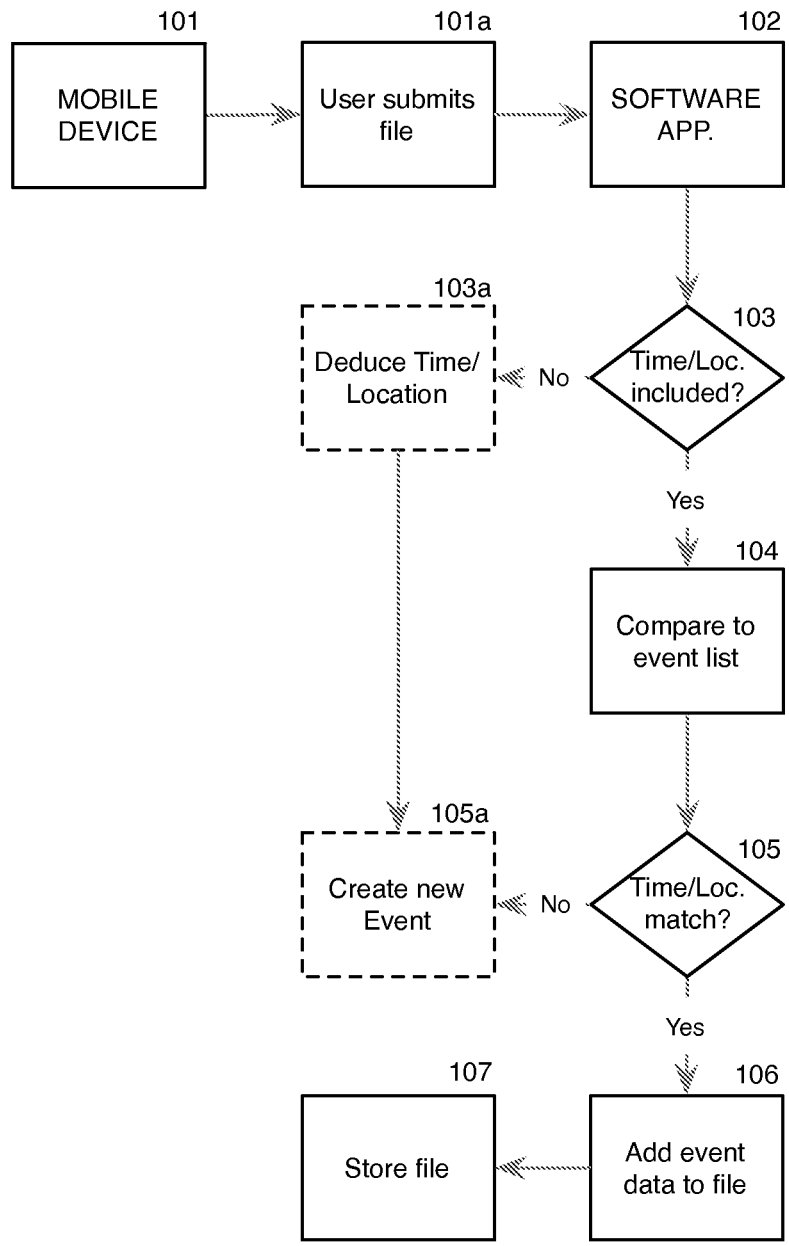

EVENT-ASSOCIATING SOFTWARE APPLICATION FOR ACCESSING DIGITAL MEDIA

The Event-Associating Software Application for Accessing Digital Media (the "Software Application" or the "System") associates (i.e., matches), by time and location, an event in a System database with a multimedia file (also referred to herein as a "media file") it receives from an electronic communications network—such as, but not limited to, electronic mobile devices and the Internet. An "event" may be any planned or unplanned occurrence, incident, or experience in the world ("Event"). One primary objective of the invention is to allow users of the Software Application to electronically submit digital multimedia files to the System for real time, electronic publication accessible to other users. Users may be journalists, investigators, law enforcement, etc.

The Software Application does this by recording and storing in a database an association between the following two factors:

Factor 1. Any digital media file, such as, but not limited to, a digital photograph, image, video, or audio file, delivered singly or mixed with other media files (collectively, the "File(s)"). Each media file's time and location data is essential to the association process.

Deducing Time and Location Data.

Digital photographs taken with a GPS-enabled (i.e., Global Positioning System-enabled) camera, such as, but not limited to, a cell phone camera, are most often encoded with Exchangeable Image File Format ("EXIF") data that provides, among other things, the time in which the digital photograph was taken and the location where the media file was created, expressed in longitude and latitude, such as 37° 37' N 122° 23' W, or by name, such as San Francisco, Calif.

Other digital media files, such as but not limited to video and audio files and photographs that lack EXIF data, have time and location added by programmed routines within the Software Application written to encode Files with time and location data as follows:

When a File is received by the Software Application—via any number of conventional file transfer methods, such as, but not limited to email, file upload, or insertion into a database—the Application checks for its creation time and location. If not present, the Software Application may be set up to add time and/or location based on one or more of the following:

(a) Pre-existing information about the sender.
(b) Information provided by persons who submit the Files.
(c) Information provided by persons who subsequently view the Files and update the data. In this instance, the Software Application allows time and location data to be edited in open source format by persons who are present at or who have verifiable knowledge of the Event that is the subject of the File (using an editing system similar to that used by Wikipedia.org, as one example).
(d) Stored data originally gathered by the System's continuous, automatic searches of the Internet.
(e) Information deduced by programming within the Software Application that enables the System to match words, phrases, and patterns that lead to time and location conclusions.

Factor 2. A list or categorized collection of events, including the time and location for each such event, as well as any other EXIF details and text comments associated with each File, maintained and stored in one or more databases (the "Events List").

An Event includes, but is not limited to any occurrence, incident, or experience in the world (e.g., concerts, shows, parties, parades, news events, natural and man-made disasters, criminal activities, military activities, and so forth). The Events List is generally maintained within the Software Application by its administrators. Events are added manually to the Events List by users of the Software Application and also by the Software Application's routines, sub-routines and/or additional software applications, written to gather event-related information from the Internet and to insert such information into the Software Application's Event List.

By checking for a match between (a) the time and location data of the Files, and (b) the list of Events and their respective time and location data, the Software Application can associate (i.e., match) digital interactive media Files with actual Events. The Software Application permits the automated accumulation of digital content that can be easily searched or browsed by users seeking digital media content related to Events or occurrences of interest to them. Potential users include, but are not limited to, individuals from the general public, news media, concertgoers, accident investigators, etc.

Alternative Methods.

The Software Application is designed to easily classify digital media files, such as, but not limited to pictures, sound, and video files, according to events (i.e., incidents, experiences, or occurrences) that have taken place anywhere in the world. The resulting collection of event-associated media allows users to easily locate specific media Files that have been collected and stored within the Software Application from numerous external sources by searching for a specific Event by keywords and phrases, including but not limited to the Event's location expressed in longitude and latitude. The Software Application also removes from the provider of the original File the burden of entering Event-related data because the Software Application can deduce the associated Event from any time and location data encoded in the File.

While the Software Application is intended as a component of a larger, consumer-oriented Web-based media service to which users can upload digital media files from, but not limited to, electronic mobile devices, the Application could also be employed in other applications to which digital media files can be easily uploaded or contributed. For example, the Software Application could be employed:

1. By public security and safety services, such as a police department that operates a public Crime Watch service to which people could, in real time, contribute digital photos or other media. These could be associated with a list of reported crimes, providing easy collection of possible evidence.
2. By military planners who receive real-time images from soldiers deployed in a conflict situation. Received files could be associated with a list of battles, patrols, etc., to assist with rapid intelligence gathering.

Because the Software Application consists of software code, there are innumerable ways in which it may be written. However, the main elements of the Software Application would remain the same, regardless of the programming language or computer platform used. The exact software implementation of the mentioned components may vary depending on the software used, but any alternate means of assembling the application must include the following elements, each of which is a core component of the Event-Associating Software Application for Accessing Digital Media:

1. A digitally encoded list of known events, along with their EXIF creation time and location data obtained through cell phone triangulation methods or with a Global Positioning System. These events could be digitally encoded within the application in several ways, such as containing them within an individual digital file or group of files, in a machine-accessible format, such as XML, or other markup languages. Alternatively, the events could be stored in an electronic database, such as Oracle, MySQL, PostgreSQL, etc.

2. A means of receiving digital media files from users. Such means may include receipt of files (i) by email (requiring inclusion of software capable of receiving, processing and sending email), (ii) by upload via the Web, (iii) by Multimedia Message System (MMS), and other similar means.

3. A method for examining received files and reading time and location data included in the file.

4. (4) The ability to link or associate the received file with the correct event. For example, the Application might write information that identifies a specific file, such as a file reference or memory address, into a database record or data file associated with an event.

DESCRIPTION OF DRAWING

Key to Reference Numbers
101=Mobile device with camera with which a user make take a photograph, video or record audio and submit the files (singly or mixed) directly from the mobile device to the Software Application for real time processing and publication
101a=User submits media file to Software Application
102=Software Application receives then begins processing digital media files
103=Software Application examines media file for time and location data
103a=If time and/or location data is missing, Software Application deduces the time and location by other means or from other sources
104=Software Application performs a search of the Event database looking for a match with the media file
105=Should time an Event not exist, then the Software Application triggers a routine for creating a new Event
105a=Software Application creates new Event
106=System appends Event data to the received media file
107=System stores the received media file Invention's Parts or Steps: Summary
Receipt of File:
First, the Software Application receives the files from a user, for example, by email or direct upload (such as by File Transfer Protocol, HTTP, Bit Torrent, SMTP, etc.), triggering into action the following sequence of events:
Read File:
Upon receipt of a new File, the Software Application reads the File in order to determine if time and location data have been included. When no EXIF time or location data is present, the Software Application may encode the File with the time it was received and with location information drawn from information the System possesses about the sender's location (such as from, but not limited to, stored profile or registration information previously provided by the sender) or from comments included with the File by the sender.
Check Events:
When the Software Application has read the EXIF and other data, it checks the List of Events described above, looking for any Events with a location or creation time that matches those of the received File.
Associate File and Event:
If the File is a match for an Event that is in the list of Events database, it is electronically marked as such, either by association in a database (such as editing a specific field) or by having the Software Application electronically attach a reference to the File itself by appending data that indicates the Event. Whichever method is used, the ultimate goal is to facilitate browsing of or searching for any one or all Files that match a specific Event that has been processed into the System.

If there is no Event available in the Events List with which to match a user-submitted media file that has been encoded with time and location (for example, an unplanned Event, such as a natural disaster), then the Software Application may create an Event based on various criteria, such as number of files received from a particular location within a specified timeframe. The Software Application creates a new Event in the database maintained by the Software Application. The Event will be made publicly accessible once it has been approved by an administrator of the Software Application. The requirement of administrative approval will prevent the appearance of System-generated Events that do not correspond to actual events and will allow accurate naming and classification of the Event.

The Software Application may be set up by the Administrator to perform certain functions electronically, as explained in the section entitled, "Description of Invention's Parts and Steps."

Publish File:
Once the Software Application associates a File with an Event, the File is made available to other users. The File will be included in search results when a user searches for Files associated with that Event, and the Event will be indicated when the user accesses the File.

Description of Invention's Parts and Steps
I. Storing Digital Media Files within the Software Application
1. A user submits an image, audio, or video file ("File") (and/or related comments in the form of a text file) $_{101a}$ to the Software Application $_{102}$ over the Internet or other electronic communications network by means of a Web page or software application. The user may tag the File to a specific event, such as "Maniaka Concert" (although the tagging is not necessary, it facilitates future "search and find" activities by enlarging the keyword and key phrases pool). The Software Application examines the Files $_{103}$ and, discerning that time and location data have been encoded into the File, compares them to the existing list of Events maintained within the Application. $_{104}$ Should the time and location data not be available, then the Software Application can deduce time and location information based on information already known about the submitter, and encode it into the File. $_{103a}$ When a match between the newly-received media file and the list of Events is found, the Software Application:

(a) Appends additional data to that File, $_{106}$ such as (i) "Stanford University Stadium, Palo Alto" (which the Software Application extrapolates and translates from the time and location data).

(b) The File is associated with the event, such as "Maniaka Concert, Nov. 18, 2008."$_{107}$ 2. Should a time- and location-encoded File not have a matching Event, then the Software Application will automatically create an Event against which it will match the File. Event approval may be achieved manually by an administrator of the Application who will approve and classify the Event, or the administrator may configure the System to electronically create and approve the Event based on its ability to read and interpret patterns, tagged information, and other data it has gathered and categorized into the List of Events. $_{105a}$ Files Arrive but Event does not Exist.
Upon receipt of a new File, the Software Application reads the File to determine if time and location data have been included. When no EXIF time or location data is present to allow the System to create an Event, the Software Application may encode the File with the time it was received and with location information drawn from information the System possesses about the sender's location (such as from, but not limited to, stored profile or registration information previously provided by the sender) or from comments included with the File by the sender.

An alternative method for managing Files that arrive with no encoded time and/or location and for which there is no pre-existing Event is to allow routines written into the Software Application to create an Event, labeling each such File with a number and then storing the File in a database created specifically for files that have no time or location information. These Files are then made available in controlled open source methodology (such as used by Wikipedia.org, for example) to Pixt members who have knowledge about the specific Event and who are able to properly label the Event and to add the accurate time, location, and text descriptions into the Files. These Files are eventually transferred to the regular System databases that have been constructed for images, videos, and audio data.

One of many examples for using this alternative method is illustrated by the following hypothetical scenario:

John Doe is vacationing on an Indonesia beachside resort when an unexpected tsunami strikes the region. John barely escapes and while on higher ground he snaps a picture with his GPS-enabled cell phone camera and quickly transmits it to Pixt.us. He has no time to label the picture, which arrives with no EXIF information. Within the next 30 minutes, the System receives numerous similar Files from 50 other members, also without time and location information or description.

The Software Application is written to respond to situations in which it receives X-number of Files from at least X-number of persons within X-number of minutes (the "Factors"), with "X" being set by the Administrator during a one-time setup procedure. When these pre-set Factors are met, the Software Application code triggers a set of routines and sub-routines designed to transfer these Files into an "open-source" database, which is made available to other members who have information about the Tsunami and can provide the missing data that completes the Event creation. An Event is created when time and location are entered, upon which the Software Application is coded to accept the time and location that is repeated a minimum of X-times, with X being a number set by the Administrator. Upon creation of the Event, the Files are automatically and electronically transmitted from the "open source" database to the Event database.

II. Retrieving Digital Media Files from the Software Application System

1. A user may access the Software Application through various interfaces, such as, but not limited to, a standard Web page, a Web page formatted for mobile devices, or a specialized application on a computer or electronic mobile device.

2. The user performs a "Search" for one or more or all Events in a specific location and/or time or time range. The user may perform the search with as little information as (a) a month (in which case all events that occurred in that month will be provided to him), (b) a year (in which case all events in the given year will be provided), (c) a date range, such as September 2008 through November 2008, (d) location information, such as the name of a venue or city, GPS coordinates, longitude and latitude. Alternatively, a user may browse a general list of Events provided by the Software Application.

These components work together as a software application that can be used in a number of ways, by people in a variety of roles. Here is how three people might use the Event-Associating Software Application for Accessing Digital Media (the "Software Application") at different times and in different ways that illustrate how the invention is used:

(i) A concert promoter submits the time, date and location of an upcoming concert (in this context, the location would normally be provided by name, such as, "San Francisco"). This could be done manually, through a Web interface to the Software Application, or the data might be submitted to an administrator of the Software Application, who would put the information directly in the database or List of Events.

(ii) An attendee at the concert takes a picture of the show on their GPS-enabled phone, and sends it via Multimedia Message Service (more commonly referred to as "MMS") to the Software Application. When the message is received, the Software Application reads the picture's timestamp and location information from the image file's EXIF data, and compares the data to its list of Events. When a match is found against the Event record created for the Event mentioned in (i) above, the image is permanently associated with the Event.

(iii) A music journalist or blogger wishes to find a photo of the concert to accompany a piece they've written. By visiting a Web page that interfaces with the Software Application, they can query the Software Application for the concert by name. The Software Application would return all photos in the list of Events that are associated with the concert name, including the one mentioned in (ii), which the blogger selects for use.

The invention claimed is:

1. A method for matching an event with a media file, the method comprising: receiving the media file into a first database; publishing the media file to be viewable to users; determining time and location information of the media file, the time and location information being determined by at least one of encoded exchangeable image file format (EXIF) data, software encoded time and date data, pre-existing information about a sender of the media file, information provided by the sender of the media file, information provided by persons who subsequently view the media file and update the time and location information, stored data originally gathered by continuous internet searching, and information deduced by matching words, phrases and patterns to lead to the time and location information; storing event information in a second database, the event information including event data as well as event time and event location data; and associating, by comparing the time and the location information of the media file in the first database with event time and event location data in the second database, the media file received from electronic communications networks with the event, wherein the event includes at least one of (i) planned or organized events, and (ii) naturally occurring or otherwise unplanned events.

2. The method of claim 1 further comprising the step of a user submitting the media file, and processing the media file's receipt, performing a series of identification functions, and storing the media file in the database.

3. The method of claim 2 wherein submitting the media file comprises using an electronic communications network selected from at least one of the Internet and electronic mobile devices and uploading files and messages using means selected from at least one of FTP (File Transfer Protocol), HTTP (Hypertext Transfer Protocol), and SMTP (Simple Mail Transfer Protocol).

4. The method of claim 1 wherein receiving the media files and messages received from external sources activates routines for electronically notating receipt of the media files, and examining the media files for time and location.

5. The method of claim 1 wherein when time or location factors are not present in the submitted media file, inserting the time or location based on algorithms, routines, and sub-routines; and calculating time and location based on one or more of (a) pre-existing information about the file sender; or (b) information provided by persons who submit the media files; or (c) information provided by persons who subsequently view the files and update the data; or (d) stored data that has been gathered by the database, automated searches of the Internet, or (e) information deduced by matching words, phrases, and patterns.

6. The method of claim 2 further comprising checking and approving media files and messages and examining one or more databases containing categorized events to find an event whose data matches data of the media file.

7. The method of claim 2 further comprising matching an event's time and location data with time and location data of the media file, wherein when the media file cannot be matched with an event, the method further comprises triggering algorithms, routines, and sub-routines to create a new event and identifying it by the provided time and location data, and storing the submitted media file with the newly created event.

8. The method of claim 2 further comprising the step of creating a new event in an events database by adding identifiers for facilitating users' search and browsing functions, the identifiers including key words and key phrases in any appended text message files simultaneously submitted during a media file submission process or in the case of email submission, by specifically adding keywords and key phrases in the body of the e-mail, or in a Web site or WAP (Wireless application protocol) site form provided for such purpose.

9. The method of claim 3 further comprising associating the time and location of a received media file with the time and location of the event in a list of events, storing the media file with the matched event, and permitting its future retrieval by a user who performs a search query for the media files or the event.

10. A method for collecting, publishing and associating media files with events, comprising: receiving the media file into a first database; publishing the media file to be viewable to users; determining time and location information of the media file, the time and location information being determined by at least one of encoded exchangeable image file format (EXIF) data, software encoded time and date data, pre-existing information about a sender of the media file, information provided by the sender of the media file, information provided by persons who subsequently view the media file and update the time and location information, stored data originally gathered by continuous internet searching, and information deduced by matching words, phrases and patterns to lead to the time and location information; storing event information in a second database, the event information including event data as well as event time and event location data; and associating, by comparing the time and the location information of the media file in the first database with event time and event location data in the second database, the media file received from electronic communications networks with the event, wherein the event includes at least one naturally occurring or otherwise unplanned events.

11. The method of claim 10 further comprising the step of a user submitting the media file, and processing the media file's receipt, performing a series of identification functions, and storing the media file in the database.

12. The method of claim 10 wherein submitting the digital media file comprises using an electronic communications network selected from at least one of the Internet and electronic mobile devices and uploading files and messages using means selected from at least one of FTP (File Transfer Protocol), HTTP (Hypertext Transfer Protocol), and SMTP (Simple Mail Transfer Protocol).

13. The method of claim 10 wherein receiving the media files and messages received from external sources activates routines for electronically notating receipt of the media files, and examining the media files for time and location.

14. The method of claim 10 wherein when time or location factors are not present in the submitted media file, inserting the time or location based on algorithms, routines, and sub-routines; and calculating time and location based on one or more of (a) pre-existing information about the file sender; or (b) information provided by persons who submit the media files; or (c) information provided by persons who subsequently view the files and update the data; or (d) stored data that has been gathered by the database automated searches of the Internet, or (e) information deduced by matching words, phrases, and patterns.

15. The method of claim 11 further comprising checking and approving media files and messages and examining one or more databases containing categorized events to find an event whose data matches data of the media file.

16. The method of claim 11 further comprising matching the event's time and location data with time and location data of the media file, wherein when the media file cannot be matched with the event, the method further comprises triggering algorithms, routines, and sub-routines to create a new event and identifying it by the provided time and location data, and storing the submitted media file with the newly created event.

17. The method of claim 11 further comprising the step of creating a new event in an events database by adding identifiers for facilitating users' search and browsing functions, the identifiers including key words and key phrases in any appended text message files simultaneously submitted during a media file submission process or in the case of email submission, by specifically adding keywords and key phrases in the body of the e-mail, or in a Web site or WAP (Wireless application protocol) site form provided for such purpose.

18. The method of claim 12 further comprising associating the time and location of a received media file with the time and location of the event in a list of events, storing the media file with the matched event, and permitting its future retrieval by a user who performs a search query for the media files or the event.

* * * * *